Patented Jan. 31, 1939

2,145,804

UNITED STATES PATENT OFFICE 2,145,804

PROCESSES OF SEPARATING NITRILE-HYDROCARBON MIXTURES BY MEANS OF PHENOLS

Anderson W. Ralston and William O. Pool, Chicago, Ill., assignors to Armour and Company, Chicago, Ill., a corporation of Illinois No Drawing. Original application July 9, 1936, Serial No. 89,850. Divided and this application October 15, 1937, Serial No. 169,328

8 Claims. (Cl. 260—464)

This invention relates to processes of separating aliphatic nitriles from admixtures thereof with hydrocarbons and it comprises processes wherein such mixtures are treated with a preferential solvent material for the nitriles to form an extract phase containing the nitrile dissolved in the solvent and a hydrocarbon phase, the two phases separated and the nitrile then separated from the extract phase.

Recently processes have been described, as in U. S. Patents 1,991,955, 2,033,536 and 2,033,537, for preparing nitriles of relatively low molecular weight from nitriles of high molecular weight. For example, by methods of pyrolysis higher aliphatic nitriles such as stearo and palmitonitrile can be "cracked" to give reaction products containing nitriles having four, five, six and seven carbon atoms. The cracking operation can be so controlled that nitriles of almost any desired number of carbon atoms say from six to eleven can be prepared from nitriles of higher molecular weight. In these processes the reaction products are homogeneous liquid mixtures containing various nitriles associated with quantities of aliphatic hydrocarbons.

Although the cracked reaction mixtures have many uses as such without further treatment, there are many instances when it is desirable to separate the nitriles from the hydrocarbons and to then fractionally distil the separated nitriles. This will yield substantially pure nitriles. And the pure nitriles are starting materials for many organic synthesis since they are sources of polar aliphatic compounds having from six to about eleven carbon atoms. Hitherto reactive compounds of this nature have not been available on a commercial scale and at a price which would enable them to be used in great quantities. In other words, the development of processes of preparing nitriles from the cheap fatty acid sources has made it possible for us to supply large quantities of aliphatic compounds having from about five to ten carbon atoms in the alkyl group, together with a highly reactive polar, or CN group. This means that many aliphatic amines, alcohols and acids, of from six to ten carbon atoms can be prepared at low cost. Hitherto these materials have been so expensive that they could not be used in the arts.

As stated, mixtures of nitriles alone can be separated readily by fractional distillation. It is difficult, however, to separate mixtures of the nitriles and hydrocarbons in this manner. Constant boiling mixtures are obtained in many instances and there are other objections. The most productive source of the lower nitriles is the higher fatty acid nitriles because of the ease with which these can be cracked to give the desired lower nitriles. But, as stated, the cracked products contain quantities of hydrocarbons.

Consequently, we have set ourselves to the problem of discovering methods by which these mixtures of nitriles and hydrocarbons can be separated to obtain the nitriles which can then be fractionally distilled if desired. And we have discovered that mixtures of this type can be treated with preferential solvents in such a manner that the nitriles are dissolved to the exclusion of the hydrocarbons. From the extract phase of nitriles and solvent we can then recover the nitriles and recover the solvent for reuse. Many experiments have been necessary, however, since what will or will not act as a preferential solvent for such mixtures could not be determined in advance of experiment. Many solvents which might seemingly dissolve the nitriles without affecting the hydrocarbons actually form homogeneous mixtures without leading to the formation of stratified layers of hydrocarbon and nitrile extract. Because of the pronounced mutual solubility of the nitriles and aliphatic hydrocarbons, many solvents dissolve the nitrile but the nitrile acts as a mutual second solvent for both hydrocarbon and added solvent. This leads to mutual solution of all constituents. Consequently, the search for satisfactory preferential solvents has been a difficult task and many unexpected discoveries have been made.

For example, we have discovered that watery solutions of aliphatic alcohols can be used successfully provided care is taken to control the quantity of water present. Thus a 75 percent solution of methyl alcohol will dissolve the nitrile but not the aliphatic hydrocarbons present but 85 percent methyl alcohol forms a homogeneous solution of alcohol, water, nitriles, and hydrocarbons. Hence the application of the broad, old, idea of preferential extraction with a suitable solvent to mixtures of the type with which we are concerned has not been a simple matter.

Moreover, having discovered a suitable preferential solvent which will give an extract containing nitriles dissolved in the solvent, the next step is the liberation of the dissolved nitrile from the extract. Here again many solvents, apparently suitable as preferential solvents must be discarded because of the difficulties in separating the nitrile therefrom. What we have sought is solvents which would dissolve the nitriles but not the hydrocarbons, which would give good clean stratification into two liquid layers, and which, by the addition of something to the extract layer, would then liberate the nitrile. These requirements have made the search for solvents prolonged.

We have, however, discovered four classes of compounds which can be used in our process and, since we are the first to deal with this problem, and to describe its solution, we claim our invention broadly in the appended claims. We believe ourselves to be the first to propose the use of preferential solvents in this art in such a manner that the nitriles are liberated from the extract phase by the addition of substances thereto which decrease the solubility of the preferential solvent for the nitrile in the extract.

We have discovered that aliphatic alcohols, phenolic compounds like phenol and the cresols, amino compounds generally aliphatic but including aniline, and the water soluble aliphatic carboxylic acids can be used under certain conditions as preferential solvents and that from the extract phase composed of solvent and nitriles we can separate the nitriles simply by adding something to the extract which acts to decrease the solubility of the nitriles.

We shall first describe our invention with reference to the use of the aliphatic alcohols. All of the alcohols which we use are miscible with water and among them we can use methyl, ethyl, propyl, both normal and iso, butyl, benzyl, furfuryl, tertiary butyl, secondary butyl, allyl, diamyl, secondary amyl and cyclohexyl. When using the alcohols we first treat the mixture of nitriles and hydrocarbons with a watery solution of the alcohol, the amount of water present being such that the nitriles are soluble in the watery alcohol but the hydrocarbons are not. We then separate off the upper layer of hydrocarbons from the lower extract phase composed of nitriles dissolved in the watery alcohol. Upon the addition of more water to the extract so as to decrease the actual concentration of alcohol the nitriles separate out since they are not soluble in extremely diluted alcohol.

As stated the various alcohols listed above can be used but for the sake of brevity we shall describe detailed examples using methyl alcohol.

One hundred parts by volume of a nitrile-hydrocarbon mixture obtained by cracking stearo-nitrile is mixed with 100 parts by volume of 75 percent methyl alcohol (75 percent alcohol, 25 percent water). Stratification occurs and the upper layer of hydrocarbons is separated off. These hydrocarbons still contain some nitriles and are advantageously re-extracted with 100 parts of 80 percent methyl alcohol. The hydrocarbon layer is again separated and again extracted with 100 parts by volume of 85 percent alcohol. The final hydrocarbon layer, amounting to 60 volumes, contains only 0.1 percent nitrogen.

The three alcoholic lower layers, or extract phase, from the three extractions are united and water added thereto until the nitriles therein separate as an upper layer which can be readily decanted. This upper layer amounts to 40 parts and has a nitrogen content of 8.9 percent. The methyl alcohol layer, after dilution as described, has a concentration of about 60 percent methyl alcohol. It can be recovered for reuse by distillation.

Instead of using three extractions with increasing strengths of alcohols we can extract directly with 80 percent methyl alcohol and get good results. Or the 80 percent methyl alcohol can be run into the top of a column of the nitrile-hydrocarbon mixture and the extract phase recovered continuously from the bottom of the column.

However, the strength of alcohol must be closely regulated so that it is strong enough to dissolve nitriles but not hydrocarbons.

We find it desirable to start with fairly dilute alcohol, such as 75 percent strength and then re-extract the separated hydrocarbon layer with alcohol of increasing strength. The more dilute alcohol removes the very low molecular weight nitriles which tend to make the hydrocarbons miscible with stronger alcohol. After the lower nitriles have been removed then the strength of the alcohol can be increased to 85 percent as described. If 85 percent alcohol were used directly a homogeneous mixture showing no stratification of hydrocarbons would result.

Normal propyl alcohol can be used in the same manner and the same concentrations as methyl alcohol. When using the other alcohols described above preliminary experiments should be run to determine the appropriate strength of alcohol for the extraction. This can be readily done on a small scale before treating large volumes of nitrile-hydrocarbon mixture.

We shall now describe modifications of our invention using aliphatic carboxylic acids as preferential solvents. All the acids we use are miscible at least to some extent with water. Among them can be mentioned the following: acetic, propionic, acrylic, iso-valeric, normal valeric, iso-butyric, normal butyric and caproic.

This modification is well illustrated by reference to the use of acetic. For example, we mix 100 parts of nitrile-hydrocarbon mixture with 100 parts of glacial acetic acid containing 4 parts of water. The mixture is cooled to 0° C. at which temperature stratification occurs. The upper layer or phase is composed of 56 parts of hydrocarbons containing 1.3 percent nitrogen. The lower layer or extract phase amounting to 144 parts contains the acetic acid and nitrile. To this lower layer we add 100 parts of water which results in the separation of an upper layer amounting to 52 parts which consists essentially of nitriles and contains 5.5 percent nitrogen. Any acetic acid present can be removed from the nitrile layer by washing with water. The hydrocarbon layer can again be extracted with the strong acetic acid to recover more nitrile therefrom. All quantities above are parts by volume.

As stated above, phenols are also suitable solvents. Among them we can use ordinary phenol, and ortho, meta, and para cresols. For example, we mix 100 parts by volume of the cracked nitrile mixture with 100 parts by volume of phenol and 30 parts by volume of water. The mixture is cooled to 0° C. which gives three layers. The bottom layer consists essentially of pure water, the top layer contains 36 parts of hydrocarbons in which the nitrogen content is 0.6 percent. The middle layer amounts to 168 parts by volume and contains phenol, water, and nitriles. To this middle layer we add dilute sodium hydroxide solution, about a 10 percent solution, until the nitrile is liberated. This gives us 64 parts by volume of nitriles containing 6 percent nitrogen. If desired the hydrocarbon layer can again be extracted with more phenol solution.

Many different amines can also be used as preferential solvents. Among them may be mentioned aniline, ethyl amine, isopropyl amine, normal propyl amine, diethyl amine, allyl amine, benzyl amine, secondary butyl amine, isobutyl amine, normal butyl amine, isoallyl amine, normal amyl amine, dinormal propyl amine, pyridine, diallyl amine and cyclohexyl amine. For example 100 parts by volume of the nitrile-hydrocarbon mixture is mixed with 100 parts by volume of aniline and the mixture cooled to 0° C. This gives an upper layer consisting of 40 parts of hydrocarbons containing 0.5 percent nitrogen and a lower layer composed of 160 parts by volume containing aniline and nitriles. To this lower layer we add dilute hydrochloric acid solution until the nitriles separate out. This gives us 60 parts of a nitrile fraction containing 5 percent of nitrogen. The aniline can be recovered for reuse by treating the solution of aniline hydrochloride with dilute caustic soda.

In the appended claims we denote the layer of nitriles dissolved in the preferential solvent as the extract phase.

This application is a division of our co-pending application Serial No. 89,850 filed July 9, 1936 wherein we specifically claim the use of aliphatic alcohol solutions as preferential solvents.

Having thus described our invention, what we claim is:

1. The process of separating aliphatic nitriles from admixture thereof with hydrocarbons which comprises treating the mixture with a preferential solvent composed of an aqueous phenolic solution containing at least about 70% of a phenol to give an extract phase containing the nitriles dissolved in said preferential solvent and a hydrocarbon phase, separating the phases, adding enough dilute alkaline solution to the extract phase to liberate the nitriles therein as a layer, and separating the nitrile layer.

2. The process of separating aliphatic nitriles from admixtures thereof with hydrocarbons, said mixture resulting from the cracking of high molecular weight fatty acid nitriles, which comprises treating the mixture with a preferential solvent composed of an aqueous phenolic solution containing at least about 70% of a phenol to give an extract phase containing the nitriles dissolved in said preferential solvent and a hydrocarbon phase, separating the phases, adding enough dilute alkaline solution to the extract phase to liberate the nitriles therein as a layer, and separating the nitrile layer.

3. The process as in claim 1 wherein the alkaline solution is a sodium hydroxide solution.

4. The process as in claim 2 wherein the alkaline solution is a sodium hydroxide solution.

5. The process as in claim 1 wherein the phenol is ordinary phenol.

6. The process as in claim 2 wherein the phenol is ordinary phenol.

7. The process as in claim 1 wherein the mixture of nitriles, hydrocarbons and a mixture of water and phenol is cooled to a temperature of about 0° C.

8. The process as in claim 2 wherein the mixture of nitriles, hydrocarbons and a mixture of water and phenol is cooled to a temperature of about 0° C.

ANDERSON W. RALSTON.
WILLIAM O. POOL.